United States Patent Office 3,677,873
Patented July 18, 1972

3,677,873
EXTRUDED SHEET MATERIAL
Ole-Bendt Rasmussen, Topstykket 7, Birkerod, Denmark
Filed Dec. 27, 1968, Ser. No. 787,387
Claims priority, application Great Britain, Dec. 29, 1967, 59,141/67
The portion of the term of the patent subsequent to May 12, 1987, has been disclaimed
Int. Cl. B32b 3/10, 5/02, 31/30
U.S. Cl. 161—109          10 Claims

ABSTRACT OF THE DISCLOSURE

An extruded sheet material having disrupted surface layers and a continuous core comprising thin lamellae laying one upon the other in flat overlapping sandwich-like arrangement, said lamellae being bonded together in the core zone and being disconnected or connected through disrupted connections in the surface layers.

A method of extruding two extrudable materials to form a sheet structure consisting of alternating lamellae of said materials, one of said materials being extruded only in the surface layers, transversely smearing out said sheet structure and subsequently disrupting the continuous structure of the surface layers.

BACKGROUND OF THE INVENTION

The present invention relates to an extruded sheet material having disrupted surface layers and a continuous core.

For many purposes it is desirable to provide a polymeric sheet material having a continuous core and disrupted surfaces. One way of imparting to sheets of a polymeric material disrupted surfaces is to treat the surfaces with a solvent. Another way is to subject the surfaces to mechanical abrasion. When such a sheet consists of a single polymeric material it is difficult to select conditions such that only the surface of said sheet is modified and to obtain at the same time a satisfactorily disrupted layer.

Another way of preparing sheets of polymeric materials having porous surface layers and a continuous core is to draw a nap while the sheet material is in molten condition. This treatment may, for instance, be carried out by means of steel rollers having a porous surface. However, a nap produced in this way is generally coarse.

It is the object of the invention to provide an extruded sheet material having a continuous core and improved disrupted surfaces.

SUMMARY OF THE INVENTION

According to one aspect of the present invention there is provided an extruded sheet material comprising thin lamellae of a polymeric material, hereinafter called the first polymeric material, said lamellae laying one upon the other in flat overlapping sandwich-like arrangement and being bonded intimately together in the continuous core, whereby said lamellae are arranged so that portions of the substantial part of said lamellae are present in the surface layers of said sheet material, the adjacent portions of the lamellae in said surface layer being disconnected or connected through disrupted connections.

As mentioned above portions of the lamellae of the first polymeric material are present in both surface layers of the sheet material. This does not imply that all lamellae of the first polymeric material have to extend over the full thickness of the sheet material. Thus some may extend to one surface and others to the opposite one. Some may even be embedded in the sheet material. However, in a preferred embodiment of the sheet material according to the invention each lamellae extends over the full thickness of the sheet material and portions thereof are located in both surface layers.

In another aspect of the invention the sheet material comprises lamellae of a second polymeric material which lamellae are located in the disrupted surface layers in interspersed relationship with the lamellae of said first polymeric material, the continuous core being devoid of said second polymeric material.

When using lamellae of a second polymeric material such lamellae may have in themselves a disrupted structure forming the above mentioned disrupted connections between the adjacent portions of the lamellae of the first polymeric material. In the sheet material according to the invention the lamellae of the second polymeric material may also be at least partially disrupted from the lamellae of the first polymeric material.

In a still further embodiment of the sheet material of the invention the second polymeric material is cracked into fibre-like particles.

It is to be understood that the term "polymeric material" can comprise several different materials, each being extrudable provided the different polymeric materials forming lamellae of the "first polymeric material" are capable of being and are actually intimately adhered to one another in the continuous core either by direct bonding or through a suitable interposed adhesive component.

The first polymeric material is preferably crystalline and oriented.

According to a further aspect of the invention there is provided a method of preparing an extruded sheet material. This method comprises the steps of extruding in an extrusion device, a first fluid polymeric material and a second fluid extrudable material in the form of interspersed streams to form a fluid sheet structure in which the second material is only present in the surface layers, subjecting the extruded sheet structure to a transverse smearing action and subsequently disrupting the continuous structure of the surface layers.

A preferred embodiment of the method of the invention comprises feeding the first fluid polymeric material to first orifices in a row comprising a multitude of orifices and the second fluid extrudable material to second orifices in said row, said first orifices alternating with said second orifices and being located so as to extrude streams of said second material only at the surfaces of said fluid sheet structure, passing the extruded streams into a collecting chamber extending along the length of said row and having a slot also extending along the length of said row.

The transverse smearing-out, by which the lamellae of the materials extruded obtain a reduced thickness can be established by moving the collecting chamber and the row of orifices relative to and along one another. In this case the collecting chamber should preferably narrow down immediately after the orifices preferably in a neck, i.e. over a very short distance, in order to produce a high shear force between the orifices in said row and the walls of the collecting chamber. The extruded lamellae are hereby deflected from the forward direction and will continue the flow in a "broadside" manner. The "broadside" flow through the collecting chamber and the slot at its end will make the lamellae drag in the direction of extrusion i.e. the sides of the lamellae will be dragged in relation to their centre portion.

An alternative method of establishing the transverse smearing-out is to move one side of the collecting chamber relative to and along the other. The sides of the lamellae will thereby be dragged in relation to each other. In this case it is less important for the collecting chamber to narrow down and there may be a long chamber zone wherein no transverse shear occur between the row of orifices and the moving parts of the collecting chamber, since the nozzle parts need not partake in the smearing action in this case. However, it is also possible to combine said two methods.

The orifices for extrusion of a large number of streams side by side into the collecting chamber are preferably closed elongated slots forming an angle with the row in which they are arranged.

The orifices for the second material are preferably provided with a central partition wall to avoid extrusion of the second material in the core. However, in principle the orifice parts extruding second material into one of the surface layers can be offset relative to those extruding into the other surface layer.

It seems to be impossible to make the spacing between the extrusion orifices of the row closer than about 1 mm. and generally a spacing of 2-3 mm. is preferred due to practical reasons. If the extrusion velocities of the two extrudable materials are equal, the original thickness of the lamellae will be equal to the distance between the slots. The desired small thickness of the lamellae is obtained by the dragging and shearing action mentioned above.

I use the term lamellae to signify any body in which one dimension is very much less than at least one of its other dimensions and in my final product one dimension is much less than the other two dimensions.

Because of the described geometrical arrangement of the extrusion the presence of the second material is avoided in a layer in which the lamellae of the first material is allowed to fuse together. The choice of said second material with regard to the choice of the disrupting process must be so that disruption occurs in and is confined to the layers where the second material is present. The sandwich-like overlapping arrangement of the lamellae in the continuous layer is a result of the dragging of the lamellae.

The shape of the lamellae will depend upon the manner of forming the sheet material. If there is established a movement of the collecting chamber in its entirety and the row of orifices relative to and along each other all the lamellae of the first polymeric material will become U-shaped with the point of the U leading in the direction of extrusion because of the dragging action described above.

If one side of the collecting chamber is moved relative to the other as the lamellae are passing htrough it such movement will cause the sides of the latter to be dragged with the effect that the lamellae of the first polymeric material will be brought to lie substantially parallel to the plane of the sheet material. In this case the shape of the lamellae viewed in a direction transverse to the length of said lamellae is referred to as a flattened S. The lamellae may be chopped into shorter lengths before being subjected to the final shear or dragging action in the extrusion device and the continuous lamellae produced will form rows of U- or S-profile in the extruded sheet material.

The disruption may be established by cracking the second polymeric material into fibres. The cracking may sometimes be less than required for bringing the cracked material into a fibre-like form. Another type of disruption consists in causing the lamellae slip relative to one another in the interfaces between said lamellae.

The cracking may be promoted by including in the second polymeric material a slipping agent for example an oil which is soluble in the fluid polymer but bleeds out on solidification of the latter. The disruption of the second material or the separation of the two sets of lamellae in the layer of the sheet material which is to be disrupted can be effected by drawing, rolling, impacting, brushing, bending, acoustic or chemical action or by means of an expansion agent. The disruption may also consist in or involve removal of the second material such as by dissolution or brushing. Two or more of the above mentioned disruption methods may be used in combination.

The shape of the lamellae depend at least partially upon the proportion between the viscosities of the polymeric material used as well as their deviations from Newtonian behaviour and upon the movements and the shape of the devices used for establishing the above mentioned dragging and shear actions. Each of the small channels through which the materials are fed to the extrusion orifices is preferbaly restricted at the orifices in order to produce a relatively high pressure drop in said orifices thus allowing the use of materials having different viscosities.

In general it is preferred to extrude the lamellae through a circular row of slots, the collecting chamber then being a corresponding circular collecting chamber. Preferably, the collecting chamber and the row are rotated relative to one another so as to form the above mentioned U-form. However, it is possible to rotate the two sides of the collecting chamber at different speeds (one of which may be zero) relative to the row of slots either in the same or in opposite direction. In this case the lamellae will obtain a form between a U- and S-form.

In the product obtained by rotating the collecting chamber as a whole relative to the circular row of slots the lamellae form helices in the extruded tube. The pitch angle of said helices will depend on the relative speeds of rotation but in case the lamellae are continuous and the process takes place without any movement of the two parts of the collecting chamber relative to each other, the pitch angle should be very small in order to reduce the thickness of the lamellae in the core portion of the sheet material to a satisfactory degree.

In case the die-lips from which the fluid sheet material is hauled off are rotated as a whole, the nip of the haul-off rollers must be constructed to rotate in a similar manner. Alternatively, the portions of the device comprising the row of extrusion orifices may be rotated and in this case the main channels feeding the extrudable materials to the orifices should be connected to the extruders through suitable concentric revolving fittings.

If the row of slots and the collecting chamber both are linear the movement between the chamber and the slots or between one side of the chamber and the slots has to be reciprocal. In this case the lamellae will be folded back and forth upon themselves.

It is sometimes desirable to draw the lamellae in two steps while they are fluid. This may be achieved by using a collecting chamber having a large number of dividing walls located after the extrusion slot so as to form in the collecting chamber a row of channels parallel to the row of extrusion orifices and feeding the fluid streams emerging from the channels into a second collecting chamber which also extends along said row. This second chamber preferably includes a restricted portion leading to its slot. This chamber as well as the row of extrusion orifices in which the fluid streams are originally formed are preferably stationary with respect to the row of slots whereas the first collecting chamber is reciprocated or rotated.

This treatment results in the above mentioned chopping action.

As mentioned above it may be desired to increase the adhesion of the lamellae of the first polymeric material to one another in the continuous core by using a further polymeric material. Such a further polymeric material may be introduced through separate channels and separate orifices in the row of orifices in the extrusion device.

DESCRIPTION OF THE PREFERRED EMBODIMENTS

Figure 1:
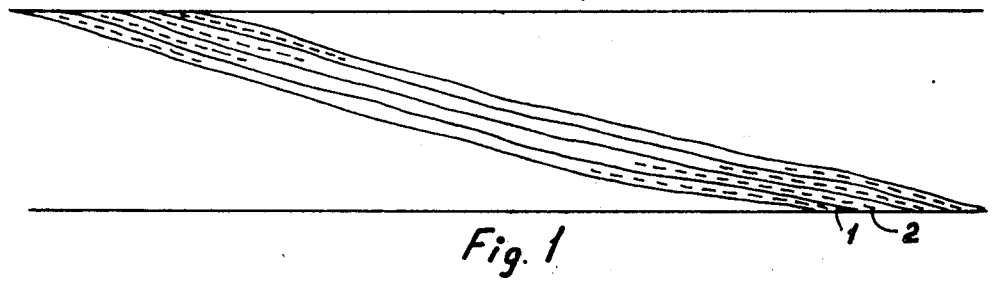
FIG. 1 is a section through a sheet material according to the invention having lamellae of flattened S form, the section being transverse to the direction of extrusion of the material.
Figure 2:
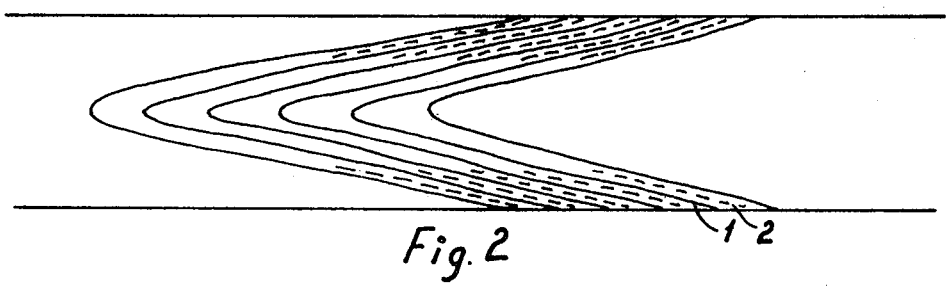
FIG. 2 is a section through another sheet material according to the invention having lamellae of U form, the section being taken in the direction of extrusion.

In each of FIGS. 1 and 2 the sheet material is shown, for simplicity, as being made of solely two polymeric materials, lamellae 1 being of the first polymeric material and lamellae 2 being of the second material. For clarity, the lamellae are represented by lines, but actually they have of course a thickness corresponding to the spacing of the full and dotted lines. This thickness and the angles to the plane of the sheet are grossly exaggerated.

The sheet structures shown in FIGS. 1 and 2 are the pure flattened S and the pure U forms respectively. In practice, sheet materials according to the invention may also have a structure intermediate between the two, and the lamellae may be arranged in a spiral arrangement. The preferred form of sheet material for most purposes is that shown in FIG. 2. As shown in FIGS. 1 and 2 the sheets have a continuous core solely formed of material 1, the lamellae 2 not extending into this core.

Figure 3:
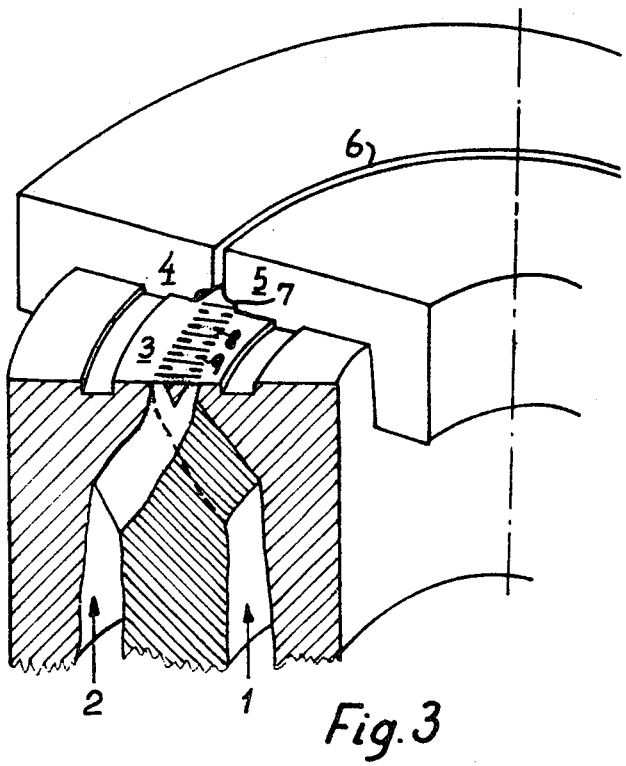
FIG. 3 is a diagrammatic perspective view, partly in section, of a ring die comprising a collecting chamber with ring slot which may be used for the production of a sheet material having lamellae of either U or S form.

The apparatus shown in FIG. 3 comprises a row of slots 3 above which is a collecting chamber consisting of parts 4 and 5 which are arranged to define an extrusion slot 6 and a neck 7. Polymeric material 1 is extruded through relatively long first slots 8 while polymeric material 2 is extruded through shorter second slots 9. The two parts of the collecting chamber may be rotated together relative to the row of slots so that the drag exerted by the bottom of the collecting chamber on the lamellae 1 and 2 as they are extruded from slots 8 and 9 causes the lamellae to be laid substantially flat along the row. Simultaneously, however, the lamellae are forced forwards by fresh palymeric material being extruded through the slots and as they are forced forwards their sides drag against the sides of the collecting chamber, and in particular against the neck 7, and the U-form of FIG. 2 results. The extruded product consists of shorter lamellae 2 separating the lamellae 1, the lamellae 2 forming disrupted surface layers on each side oft he sheet material.

However, the two parts 4 and 5 of the collecting chamber may also be moved in opposite directions to exert a symmetrical drag on the two sides of the lamellae, whereby a S-form is produced. For this purpose, the reduction of thickness within the collecting chamber ought to take place less rapidly, and it is even possible to avoid said reduction. The mixed forms between the S and U can also be produced by suitably selecting the relative and absolute speeds of the two parts 4 and 5.

I claim:

1. Synthetic sheet material having open textured surface layers in integral association with a solid coherent core layer, said material comprising an array of thin generally parallel closely spaced lamellae of at least one polymeric material having their faces in at least the regions adjacent the opposite sheet surfaces extending at an inclined angle relative to said surfaces so that in such regions said lamellae lie in a generally flat overlapping sandwich-like arrangement, said lamellae having their faces in an interior region bonded intimately together to form a solid coherent core layer and their faces in said surface regions connected at most by disrupted connections.

2. A sheet material as in claim 1, in which each lamella of said polymeric material extend into both of said surface regions.

3. A sheet material as in claim 1, in which lamellae of a second polymeric material are disposed in interspersed relationship with the lamellae of said first polymeric material.

4. A sheet material as in claim 3, in which the lamellae of the second polymeric material are at least partially disrupted from the lamellae of the first polymeric material.

5. A sheet material according to claim 3, wherein lamellae of a further polymeric material are interspersed in intimately adhering relation with the lamellae of the first polymeric material in the solid core region of said sheet material.

6. A sheet material as in claim 3 in which the second polymeric material is cracked into fibre-like particles.

7. A sheet material as in claim 1, in which the first polymeric material is crystalline and oriented.

8. The sheet material of claim 1 wherein the faces of said lamellae in said surface regions are free of connection, said lamellae being held together by the coherent core layer in the interior region thereof.

9. The sheet material of claim 3 wherein the faces of said lamellae of said first polymeric material are connected in said surface regions by randomly arranged fibers resulting from disruption of said lamellae of said second polymeric material in said regions.

10. The sheet material of claim 1 wherein said lamellae of said second polymeric material are confined to the surface regions of the sheet whereby the solid coherent core layer is free of said second polymeric material.

References Cited

UNITED STATES PATENTS

| | | | |
|---|---|---|---|
| 3,323,978 | 6/1967 | Rasmussen | 161—169 |
| 3,428,506 | 2/1969 | Johnstone | 156—148 |
| 3,454,455 | 7/1969 | Rasmussen | 161—112 |
| 3,484,916 | 12/1969 | Johnstone | 28—72.2 |
| 3,499,822 | 3/1970 | Rasmussen | 161—169 |
| 3,503,836 | 3/1970 | Rasmussen | 161—109 |

ROBERT F. WHITE, Primary Examiner

J. R. THURLOW, Assistant Examiner

U.S. Cl. X.R.

161—169, 402; 264—171, 210